US011397632B2

(12) United States Patent
Beekhof et al.

(10) Patent No.: US 11,397,632 B2
(45) Date of Patent: Jul. 26, 2022

(54) SAFELY RECOVERING WORKLOADS WITHIN A FINITE TIMEFRAME FROM UNHEALTHY CLUSTER NODES

(71) Applicant: Red Hat, Inc., Raleigh, NC (US)

(72) Inventors: Andrew Beekhof, Canberra (AU); Nir Yehia, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/085,328

(22) Filed: Oct. 30, 2020

(65) Prior Publication Data
US 2022/0138036 A1 May 5, 2022

(51) Int. Cl.
G06F 15/173 (2006.01)
G06F 11/07 (2006.01)
H04L 43/10 (2022.01)

(52) U.S. Cl.
CPC ...... G06F 11/0757 (2013.01); G06F 11/0709 (2013.01); H04L 43/10 (2013.01)

(58) Field of Classification Search
CPC ... G06F 11/0757; G06F 11/0709; H04L 43/10
See application file for complete search history.

(56) References Cited

U.S. PATENT DOCUMENTS 7,451,359 B1 * 11/2008 Coekaerts ........... G06F 11/0709
709/223
10,938,626 B2 * 3/2021 Gupta ..................... H04L 47/50
2006/0242453 A1 * 10/2006 Kumar ................ G06F 11/0709
714/4.1
2009/0113034 A1 * 4/2009 Krishnappa ............. G06F 15/16
709/223

(Continued)

FOREIGN PATENT DOCUMENTS

CN 110750379 2/2020
CN 110798375 2/2020

(Continued)

OTHER PUBLICATIONS

Larsson, et al., "Impact of ETCD deployment on Kubernetes, Istio, and application performance", Mar. 5, 2020, https://arxiv.org/pdf/2004.00372.pdf.

(Continued)

Primary Examiner — Padma Mundur
(74) Attorney, Agent, or Firm — Womble Bond Dickinson (US) LLP

(57) ABSTRACT

Systems and methods for managing nodes that have lost contact with a control plane are disclosed. A first node among a plurality of nodes may use a polling process to monitor for a polling signal response from a control plane at periodic intervals, wherein the polling signal response indicates a health status of the first node as healthy. In response to not receiving the polling signal response for a threshold number of consecutive intervals, the first node may identify a subset of peer nodes among the plurality of nodes and instruct each peer node in the subset to inquire as to the health status of the first node from the control plane. The first node may perform an action based on a response received from each of the subset of peer nodes after inquiring as to the health status of the first node from the control plane.

20 Claims, 6 Drawing Sheets

(56) References Cited

U.S. PATENT DOCUMENTS

| | | | | |
|---|---|---|---|---|
| 2010/0115338 A1* | 5/2010 | Rao | ............ | G06F 11/0709 |
| | | | | 714/37 |
| 2011/0289344 A1* | 11/2011 | Bae | ............ | G06F 11/202 |
| | | | | 714/4.2 |
| 2012/0179802 A1* | 7/2012 | Narasimhan | ........ | H04L 41/0806 |
| | | | | 709/223 |
| 2014/0075017 A1* | 3/2014 | Wang | ............ | G06F 9/5027 |
| | | | | 709/224 |

FOREIGN PATENT DOCUMENTS

| | | |
|---|---|---|
| CN | 110825490 | 2/2020 |
| CN | 110825495 | 2/2020 |

OTHER PUBLICATIONS

Lloyd, "Cluster @%#'d—How to Recover a Broken Kubernetes Cluster", Codefresh, Jul. 28, 2017, https://codefresh.io/kubernetes-tutorial/recover-broken-kubernetes-cluster/.

Netto, et al., "State machine replication in containers manages by Kubernetes", Federal University of Santa Catarina Campus, Brazil; NESC-ID, Institute Superior Técnico, Universidade de Lisboa, Lisboa, Portugal; Institute Federal Catarinense, Campus Blumenau, Blumenau, Santa Catarina, Brazil, Dec. 27, 2016, https://www.gsd.inesc-id.pt/~mpc/pubs/smr-kubernetes.pdf.

"Replacing an unhealthy ETCD member", Red Hat, Inc., 2020, https://docs.openshift.com/container-platfomn/4.4/backup_and_restore/replacing-unhealthy-etcd-member.html.

* cited by examiner

SAFELY RECOVERING WORKLOADS WITHIN A FINITE TIMEFRAME FROM UNHEALTHY CLUSTER NODES

TECHNICAL FIELD

Aspects of the present disclosure relate to container orchestration engines, and more particularly, to recovery of workloads that are running on a cluster.

BACKGROUND

A container orchestration engine (such as the Redhat™ OpenShift™ module) may be a platform for developing and running containerized applications and may allow applications and the data centers that support them to expand from just a few machines and applications to thousands of machines that serve millions of clients. Container orchestration engines may provide an image-based deployment module for creating containers and may store one or more image files for creating container instances. Many application instances can be running in containers on a single host without visibility into each other's processes, files, network, and so on. Each container may provide a single function (often called a "service") or component of an application, such as a web server or a database, though containers can be used for arbitrary workloads.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
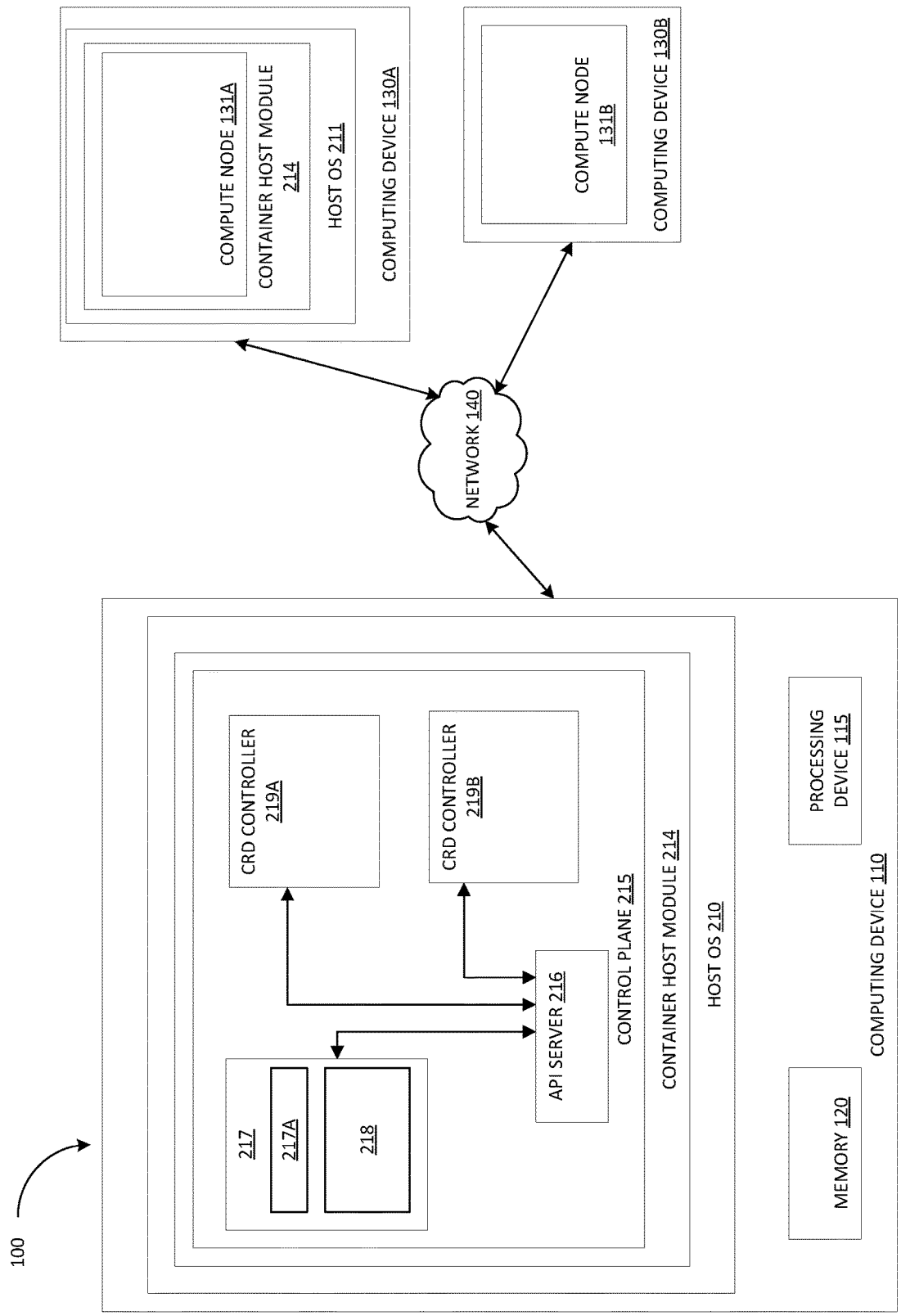
FIG. 1 is a block diagram that illustrates an example system, in accordance with some embodiments of the present disclosure.

A container host module may be a platform for developing and running containerized applications and may allow applications and the data centers that support them to expand from just a few machines and applications to thousands of machines that serve millions of clients. A container host module (e.g., Kubernetes platform) may be comprised of a control plane and a cluster of worker nodes on which container instances may be created and run. Many application instances can be running in containers on a single host without visibility into each other's processes, files, network, and so on and the containers can be used for arbitrary workloads.

In situations where the worker nodes and the control plane are cut off from each other, it is important to know whether the issue is with the control plane or with the worker nodes. For example, if the problem is with a worker node, the control plane may want the worker node to shut down, so it can start the processes that the worker node was running elsewhere. This is particularly important for processes that can only run in one place at a time. Existing remediation strategies require API credentials that allow worker nodes to be reprovisioned or power cycled. One existing remediation technique for worker nodes is referred to as power fencing, where the control plane may have network access to a power switch which may allow it to cut the power to certain worker nodes. When the control plane shuts off a worker node, it may assume that whatever state the worker node was in, it is now in a safe state and the applications etc. that it was running can be started somewhere else. However, such a technique may not be available in clusters where programmatic access to the underlying infrastructure is not possible, such as user provisioned infrastructure clusters. In addition, even clusters where the technique is available may not allow universal application of such techniques owing to security policies. Another issue is that if the control plane uses the same network to communicate with worker nodes as well as the power, and the network is cut, the worker nodes cannot be seen and nor can their power be cut. Thus, some action must be performed by the worker node as well.

Previous solutions for taking action by a worker node involve determining if a connection to the control plane exists, and if not determining if a quorum exists among peer worker nodes. If there is no quorum among peer worker nodes, then the worker node may shut itself off. However, such approaches are not nuanced enough to handle various corner cases that may arise.

The present disclosure addresses the above-noted and other deficiencies by using a processing device of a first node among a plurality of nodes to transmit a polling signal (301) to a control plane at periodic intervals, where the polling signal inquires as to a health status of a first node. If the first node determines based on the response from the control plane that its health status is unhealthy, or it is unable to communicate with the control plane, then it may utilize its respective watchdog device to initialize a shut down and enter a safe state (e.g., by power cycling). The first node may utilize a polling process for polling the control plane, and the polling process may send a heartbeat signal (302) to the respective watchdog device every time it receives a reply from the control plane indicating the first node's status as healthy. The watchdog device of the first node may monitor for the heartbeat signal at regular intervals and only initiate a shut down when the heartbeat signal has not arrived for a threshold number of intervals. In this way, a shut down based on a false unhealthy assessment due to transient resource unavailability of the first node (e.g., the special process cannot poll the control plane) can be prevented.

However, if the polling signal (301) has not been received for a threshold number of consecutive intervals, this may be indicative of other situations that can result in a false unhealthy assessment of a node due to network splits, for example. Network splits include scenarios where the control plane may be hung, in which case it cannot communicate with the polling process and there is a substantial likelihood that the polling process will miss more than the threshold number of successive heartbeat signals, and the respective watchdog may initiate shut down of the first node even though it is still healthy. Thus, in response to not receiving the polling signal (301) for a threshold number of consecutive intervals, the processing device may identify a subset of peer nodes among the plurality of nodes and instruct each peer node in the subset to inquire as to the health status of the first node from the control plane. The first node may perform an action based on the number and types of responses received from the subset of peer nodes after they have inquired as to the health status of the first node from the control plane.

FIG. 1 is a block diagram that illustrates an example system 100. As illustrated in FIG. 1, the system 100 includes a computing device 110, and a plurality of computing devices 130. The computing devices 110 and 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between computing device 110 and computing devices 130. Each computing device may include hardware such as processing device 115 (e.g., processors, central processing units (CPUs), memory 120 (e.g., random access memory 120 (e.g., RAM), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110.

Each computing device may comprise any suitable type of computing device or machine that has a programmable processor including, for example, server computers, desktop computers, laptop computers, tablet computers, smartphones, set-top boxes, etc. In some examples, each of the computing devices 110 and 130 may comprise a single machine or may include multiple interconnected machines (e.g., multiple servers configured in a cluster). The computing devices 110 and 130 may be implemented by a common entity/organization or may be implemented by different entities/organizations. For example, computing device 110 may be operated by a first company/corporation and one or more computing devices 130 may be operated by a second company/corporation. Each of computing device 110 and computing devices 130 may execute or include an operating system (OS) such as host OS 210 and host OS 211 of computing device 110 and 130 respectively, as discussed in more detail below. The host OS of a computing device 110 and 130 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a container orchestration engine) while computing devices 130 may each implement a compute node (e.g., as part of the container orchestration engine).

In some embodiments, a container orchestration engine 214 (referred to herein as container host 214), such as the Redhat™ OpenShift™ module, may execute on the host OS 210 of computing device 110 and the host OS 211 of computing device 130, as discussed in further detail herein. The container host module 214 may be a platform for developing and running containerized applications and may allow applications and the data centers that support them to expand from just a few machines and applications to thousands of machines that serve millions of clients. Container host 214 may provide an image-based deployment module for creating containers and may store one or more image files for creating container instances. Many application instances can be running in containers on a single host without visibility into each other's processes, files, network, and so on. In some embodiments, each container may provide a single function (often called a "micro-service") or component of an application, such as a web server or a database, though containers can be used for arbitrary workloads. In this way, the container host 214 provides a function-based architecture of smaller, decoupled units that work together.

Container host 214 may include a storage driver (not shown), such as OverlayFS, to manage the contents of an image file including the read only and writable layers of the image file. The storage driver may be a type of union file system which allows a developer to overlay one file system on top of another. Changes may be recorded in the upper file system, while the lower file system (base image) remains unmodified. In this way, multiple containers may share a file-system image where the base image is read-only media.

An image file may be stored by the container host 214 or a registry server. In some embodiments, the image file may include one or more base layers. An image file may be shared by multiple containers. When the container host 214 creates a new container, it may add a new writable (e.g., in-memory) layer on top of the underlying base layers. However, the underlying image file remains unchanged. Base layers may define the runtime environment as well as the packages and utilities necessary for a containerized application to run. Thus, the base layers of an image file may each comprise static snapshots of the container's configuration and may be read-only layers that are never modified. Any changes (e.g., data to be written by the application running on the container) may be implemented in subsequent (upper) layers such as in-memory layer. Changes made in the in-memory layer may be saved by creating a new layered image.

While the container image is the basic unit containers may be deployed from, the basic units that the container host 214 may work with are called pods. A pod may refer to one or more containers deployed together on a single host, and the smallest compute unit that can be defined, deployed, and managed. Each pod is allocated its own internal IP address, and therefore may own its entire port space. A user (e.g., via the container host module 214) may define the entry point script of a pod to instruct the pod to configure itself as a unique simulated compute node with its own IP addresses and simulated network stacks and communicate with the internal API of the control plane. Containers within pods may share their local storage and networking. In some embodiments, pods have a lifecycle in which they are defined, they are assigned to run on a node, and they run until their container(s) exit or they are removed based on their policy and exit code. Although a pod may contain one or more than one container, the pod is the single unit that a user may deploy, scale, and manage. The control plane 215 of the container host 214 may include controllers 215A-D, one or more of which may be e.g., a replication controller that indicates how many pod replicas are required to run at a time and may be used to automatically scale an application to adapt to its current demand.

By their nature, containerized applications are separated from the operating systems where they run and, by extension, their users. The control plane 215 may expose applications to internal and external networks by defining network policies that control communication with containerized applications (e.g., incoming HTTP or HTTPS requests for services inside the cluster 131).

A typical deployment of the container host 214 may include a control plane 215 and a cluster of worker nodes 131, including worker nodes 131A and 131B (also referred to as compute machines). The worker nodes 131 may run the aspects of the container host 214 that are needed to launch and manage containers, pods, and other objects. For example, a worker node may be a physical server that provides the processing capabilities required for running containers in the environment. A worker node may also be implemented as a virtual server, logical container, or GPU, for example.

The control plane 215 may include REST APIs (not shown) (e.g., Kubernetes APIs) which expose objects, as well as controllers 218 and 219 which read those APIs, apply changes to objects, and report status and/or write back to objects. Objects may be persistent entities in the container host 214, which are used to represent the state of the cluster 131 (e.g., deployments, replicasets, and pods). The control plane 215 may run an API server 216 (e.g., Kubernetes API server) that validates and configures the data for objects such as e.g., pods, services, and controllers as well as provides a focal point for the cluster 131's shared state. The control plane 215 may also run a scheduler service (not shown) that considers the resource needs of a pod, such as CPU or memory, along with the health of the cluster, and then schedules the pod to an appropriate worker node 131.

Controllers 218 and 219 may observe the state of the cluster 131 via the API server 216 and look for events corresponding to changes either to the desired state of resources (e.g., create, update, delete) or the cluster (e.g., pod or node dies). Controllers 218 and 219 may then make changes to the cluster 131 to ensure that the current state matches the desired state described by the observed resource (referred to as reconciling). Each controller 218 and 219 observes and reconciles certain object types as defined by the controller's metadata which includes an object type the controller will observe/reconcile and the particular class filters (if applicable) it uses, for example. The controllers 218 and 219 actuate objects after they are written by observing object types, and then triggering reconciles from events. After an object is created/updated/deleted, controllers observing that object type will receive a notification that the object has been changed, and they may read the state of the cluster 131 to see what has changed (instead of relying on the event for this information). For example, when a user wishes to scale up a deployment, a request may be sent to the API server 216 with the new desired configuration. The API server 216 in return publishes the change which is read by the deployment controller observing the deployment. Thus, the deployment controller creates one or more pods to conform to the new definition. A new pod creation is, in itself, a new change that the API server 216 may also broadcast to all event listeners. So, if there are any actions that should get triggered upon creation of a new pod, they may be registered automatically.

The control plane 215 may also include a cluster state store (hereinafter referred to as an "etcd store" and shown in FIG. 2) that stores the persistent master state of the cluster 131. The control plane 215 may also include a controller-manager service such as e.g., Kubernetes-controller-manager (referred to herein as "controller manager 217") that includes a set of informers 217A that watch the etcd store for changes to objects such as replication, namespace, and "serviceaccount" controller objects, and then uses the API to enforce the specified state. The controller-manager 217 may host a number of core controllers 218. For example, one controller 218 may consult the scheduler service and ensure that the correct number of pods is running. Another controller 218 may monitor pods, and if a pod goes down, may notice and respond. Another controller 218 connects services to pods, so requests go to the right endpoints. Still other controllers 218 may create accounts and API access tokens etc. The controller-manager 217 may include an informer 217A, to drive the reconciliation loop for each controller 218 through API events.

In situations where the worker nodes 131 and the control plane 215 are cut off from each other, it is important to know whether the issue is with the control plane 215 or with the worker nodes 131. For example, if the problem is with a worker node 131, the control plane 215 may want the worker node 131 to shut down, so it can start the processes that the worker node 131 was running elsewhere. This is particularly important for processes that can only run in one place at a time. One existing technique for managing worker nodes 131 is referred to as power fencing, where the control plane 215 may have network access to a power switch which may allow it to cut the power to certain worker nodes 131. When the control plane 215 shuts off a worker node 131, it may assume that whatever state the worker node was in, it is now in a safe state and the applications etc. that it was running can be started somewhere else. However, such a technique may not be available in all environments, and environments where the technique is available do not allow universal application of such techniques owing to security policies. Another issue is that if the control plane 215 uses the same network to communicate with worker nodes 131 as well as the power, and the network is cut, the worker nodes cannot be seen and nor can their power be cut. Thus, some action must be performed by the worker node 131 as well.

Previous solutions for taking action by a worker node 131 involve determining if a connection to the control plane exists, and if not determining if a quorum exists among peer worker nodes 131. If there is no quorum among peer worker nodes 131, then the worker node 131 may shut itself off. However, such approaches are not nuanced enough to handle various corner cases that may arise.

Figure 2:
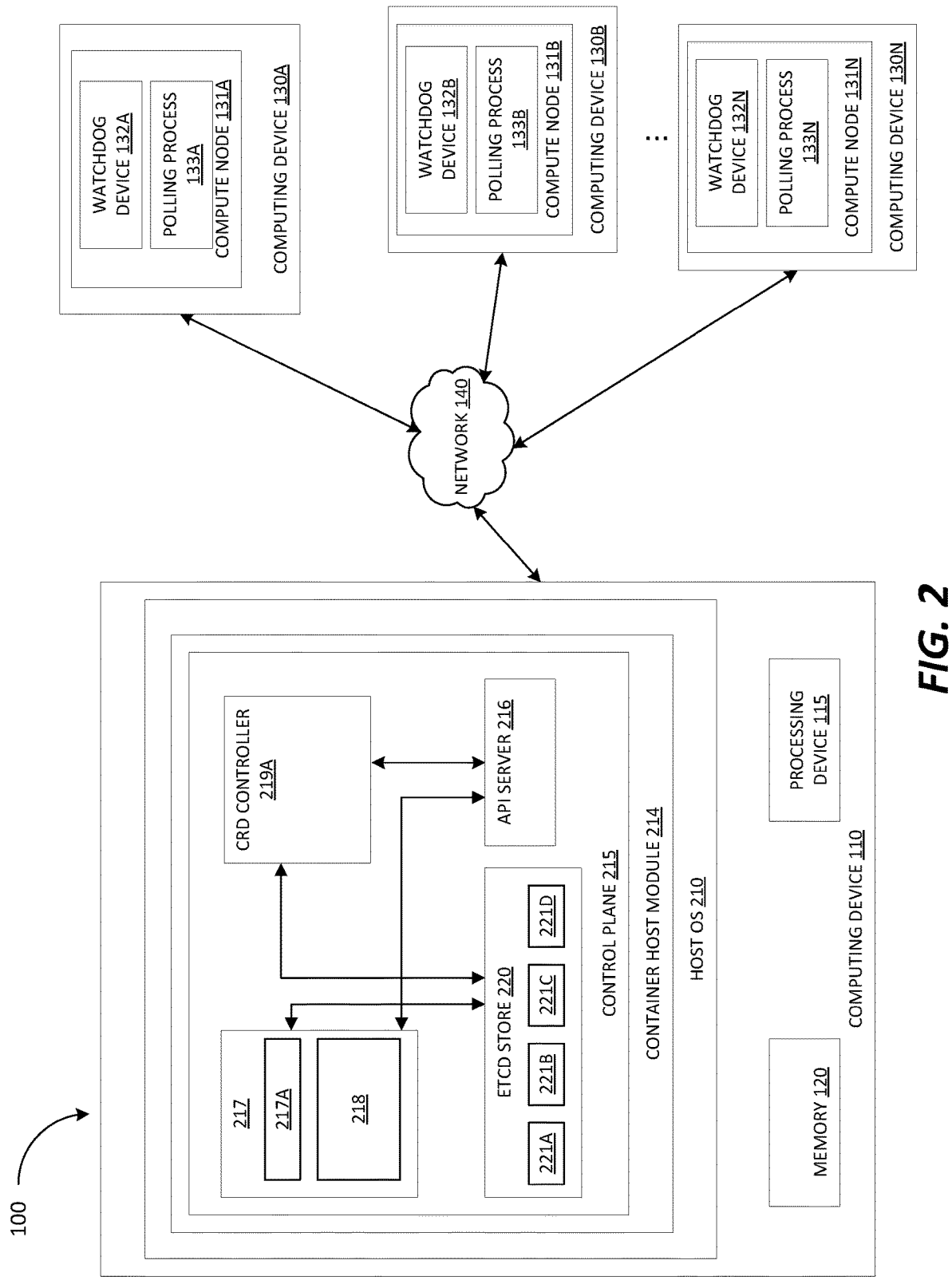
FIG. 2 is a block diagram that illustrates an example system, in accordance with some embodiments of the present disclosure.

FIG. 2 illustrates the system 100 in accordance with some embodiments of the present disclosure. The etcd store 220 may also maintain records 221 of the health status for each of the nodes 131. A corresponding record 221 for each node 131 may include information regarding the health of the node 131 ("health information"). This health information may include information regarding: whether the control plane 215 is still in communication with the node (communication status), a memory capacity of the node (e.g., are the disks of the node 131 full/running out of memory?), and a processing capacity of the node (e.g., are there too many processes running on the node?). The control plane 215 may include a machine health check component (not shown) that determines whether each node 131 is healthy or unhealthy based on criteria defined by e.g., a user and update a corresponding record 221 of the node with the health status (e.g., healthy or unhealthy) whenever a health update (303) is received from the node's container engine (131A?). Each health update may include multiple attributes of the node. The criteria may be based on any combination of the above factors, including communication status, memory capacity, and processing capacity. For example, the criteria may specify that a node 131 must have insufficient memory and insufficient processing capacity for 30 seconds, before that node 131 can be declared unhealthy.

Each node 131 may communicate with the control plane 215 by using its polling process 133 to send a polling signal at regular intervals to inquire as to its health status (or the health status of another node 131) from the control plane 215. If a node 131 (in the example described herein, node 131A) determines that it is unhealthy based on its health status (e.g., based on the reply received from the control plane 215), then its polling process 133 may stop transmitting a heartbeat signal to its respective watchdog device 132A, eventually causing the watchdog device 132A to trigger a shut down and enter a safe state (e.g., by power cycling) as discussed in further detail herein. Each of the nodes 131 may include a respective watchdog device 132 that will initiate a shut down of the node 131 based on certain conditions as discussed in further detail herein. The watch dog device 132 for each node 131 may be implemented in hardware, software, or may be virtualized.

However, there are situations that can result in a false unhealthy assessment of a node 131A and thus an unnecessary shut down. An example of such a situation includes where the corresponding polling process 133A of a node 131A cannot communicate with the control plane 215 because of resource unavailability (e.g., CPU unavailability) of the node 131A. If the node 131A cannot reach the control plane 215 in this scenario, then it may initiate a shut down even though it may be healthy as its polling process 133A cannot transmit polling signals to the control plane 215 to inquire as to its health status and thus cannot transmit heartbeat signals to the respective watchdog device 132A.

To prevent a shut down based on a false unhealthy assessment due to resource unavailability of a node 131A, the polling process 133A may periodically (e.g., at regular intervals) assess node 131A's health status (by sending polling signals to the control plane 215 as discussed above) and send a heartbeat signal to the watchdog device 132A of the node 131A if it is healthy. If the node 131A is unhealthy or the polling process 133A did not have access to sufficient resources of the node 131A at that particular interval, then the polling process 133A may not transmit a heartbeat signal to the node 131A's watch dog device 132A. The watch dog device 132A may monitor for the heartbeat signal and if the watch dog device 132 does not receive a threshold number of successive heartbeat signals, it will initiate a shut down of its node 131. By waiting for a threshold number of successive heartbeat signals before shutting down the node 131A, the watchdog device 132A may allow sufficient time for e.g., CPU resources of the node 131A to be available (and thus the resource unavailability to be remedied) so that the polling process 133A can transmit polling signals to the control plane 215 and determine node 131A's health status.

There are also situations that can result in a false unhealthy assessment of a node 131A due to network splits. For example, the control plane 215 may be hung, in which case there is a substantial likelihood that the polling process 133A will miss more than the threshold number of successive heartbeat signals, and the watchdog 132A may initiate shut down of the node 131A even though it is still healthy. To prevent shutting down the node 131A based on a false unhealthy assessment due to a network split, in response to not receiving a reply from the control plane 215 for a threshold number of successive polling signals (thereby causing the polling process 133A to not send a threshold number of consecutive heartbeat signals to the watchdog device 132A), the node 131A may select a random subset of peer nodes 131 and ask each of them to communicate with the control plane 215 and inquire with the control plane 215 as to its health status.

Each of the peer nodes 131 in the subset may attempt to communicate with the control plane 215 to ascertain the health status of the node 131A and then respond to the node 131A. The response from a peer node 131 may indicate that the node 131A is healthy, the node 131A is unhealthy, or that the peer node 131 is unable to communicate with the control plane 215. Alternatively, no response may be received from the peer node 131 (e.g., because of timeout or any TCP/HTTP error).

If any of the peer nodes 131 in the subset report that the node 131A is healthy, then node 131A may determine that it is healthy and the polling process 133A may send a heartbeat signal to the watchdog device 132A. This is because not all peer nodes 131 will have the same view of the etcd store 220 and will not be exactly synchronized. If at least one peer node 131 reports that the node 131A is unhealthy, and the remaining peer nodes 131 report that they are unable to communicate with the etcd store 220 on the control plane 215, or no response is received from one or more remaining peer nodes 131 (e.g., because of timeout or any TCP/HTTP error), then the node 131A may utilize the watchdog device 132A to reset itself. If more than a threshold number of the subset of peer nodes 131 report that they are unable to communicate with the control plane 215, this may indicate that there is an issue with control plane 215 and that the nodes 131 may be healthy. Thus, node 131A (via polling process 133A) may continue to send heartbeat signals to watchdog device 132A. If there is no response from a majority of the subset of peer nodes 131, this may indicate that there is an issue with node 131A itself and the node 131A may utilize its watchdog device 132A to trigger a reset of itself. In any other case, the node 131A may randomly select another subset of peer nodes 131 and ask them to inquire as to its health status from the control plane 215 and report back to it. The above described process may be performed by any node 131 that is unable to retrieve its own health status from the control plane 215.

The embodiments described hereinabove allow worker nodes that are cut off from the control plane to determine if the problem is with the control plane or with the worker nodes themselves and take corrective action based on communication with a subset of peer worker nodes. The communication with the subset of peer worker nodes may extend beyond calculation of a simple quorum as discussed herein, and may be utilized to handle corner cases where calculation of a simple quorum is insufficient. By obtaining a more accurate picture of whether a node needs to be shut down or not, decisions regarding workload recovery (e.g., whether a node's workload should be moved to a new node) can be made with more confidence. This is important because systems such as Kubernetes won't run the workload of an unhealthy node anywhere else until it can make sure the workload is no longer running on the unhealthy node. However, if communication with the unhealthy node is compromised, there is no way to know the node's status.

The workload recovery system described herein minimizes application downtime by making it possible to reschedule affected applications from unhealthy nodes onto other healthy node(s) within a known finite time period, minimizing their downtime and by triggering a reset of the unhealthy node in order to recover compute capacity rapidly. Restoring compute capacity makes additional CPU cycles and RAM available which can be used to scale up affected workloads, and/or reduce the impact on nodes where affected workloads had been moved to, and/or provide resilience against future failures.

Figure 3:
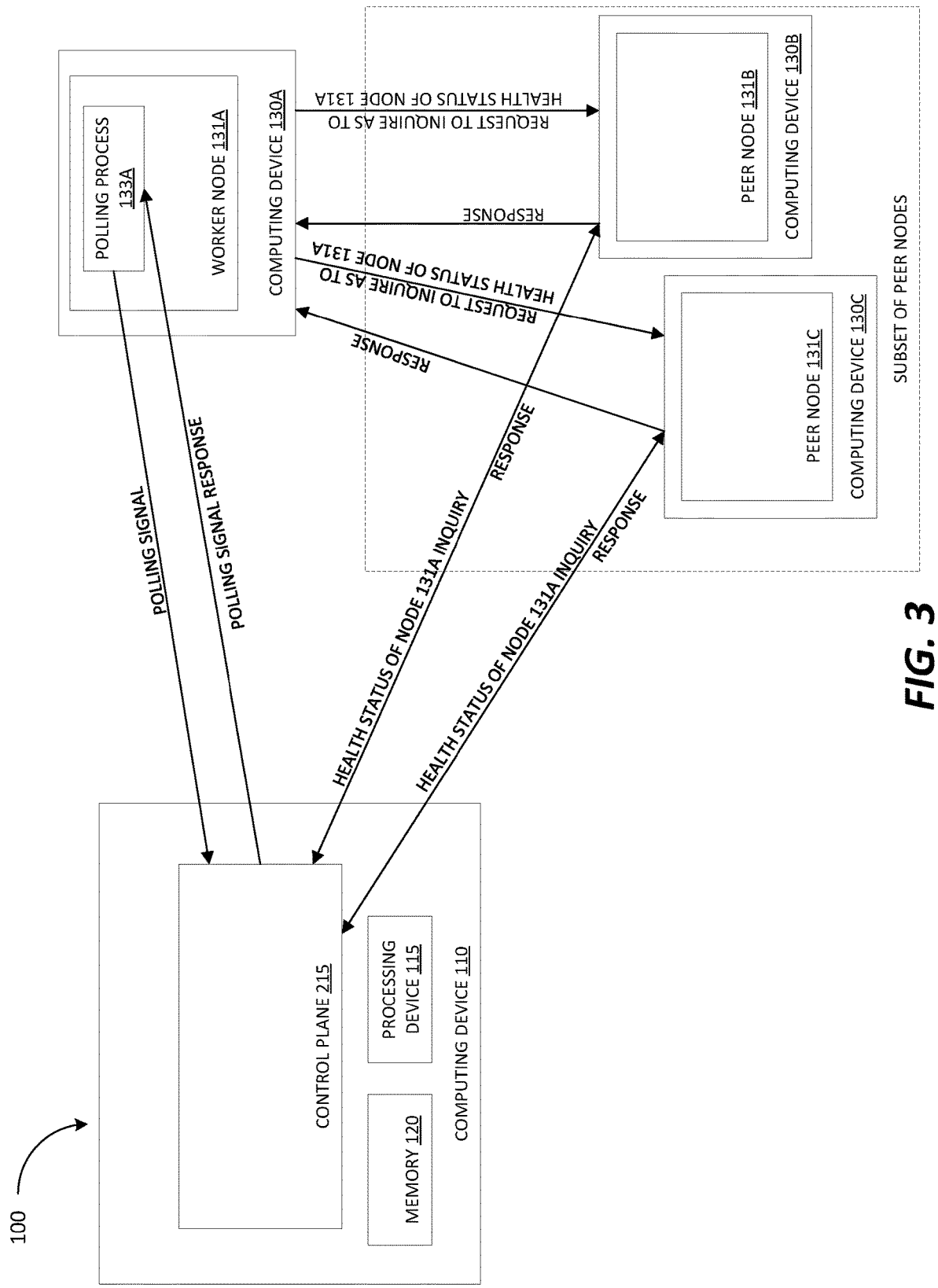
FIG. 3 is a block diagram that illustrates an example system, in accordance with some embodiments of the present disclosure.
Figure 4:
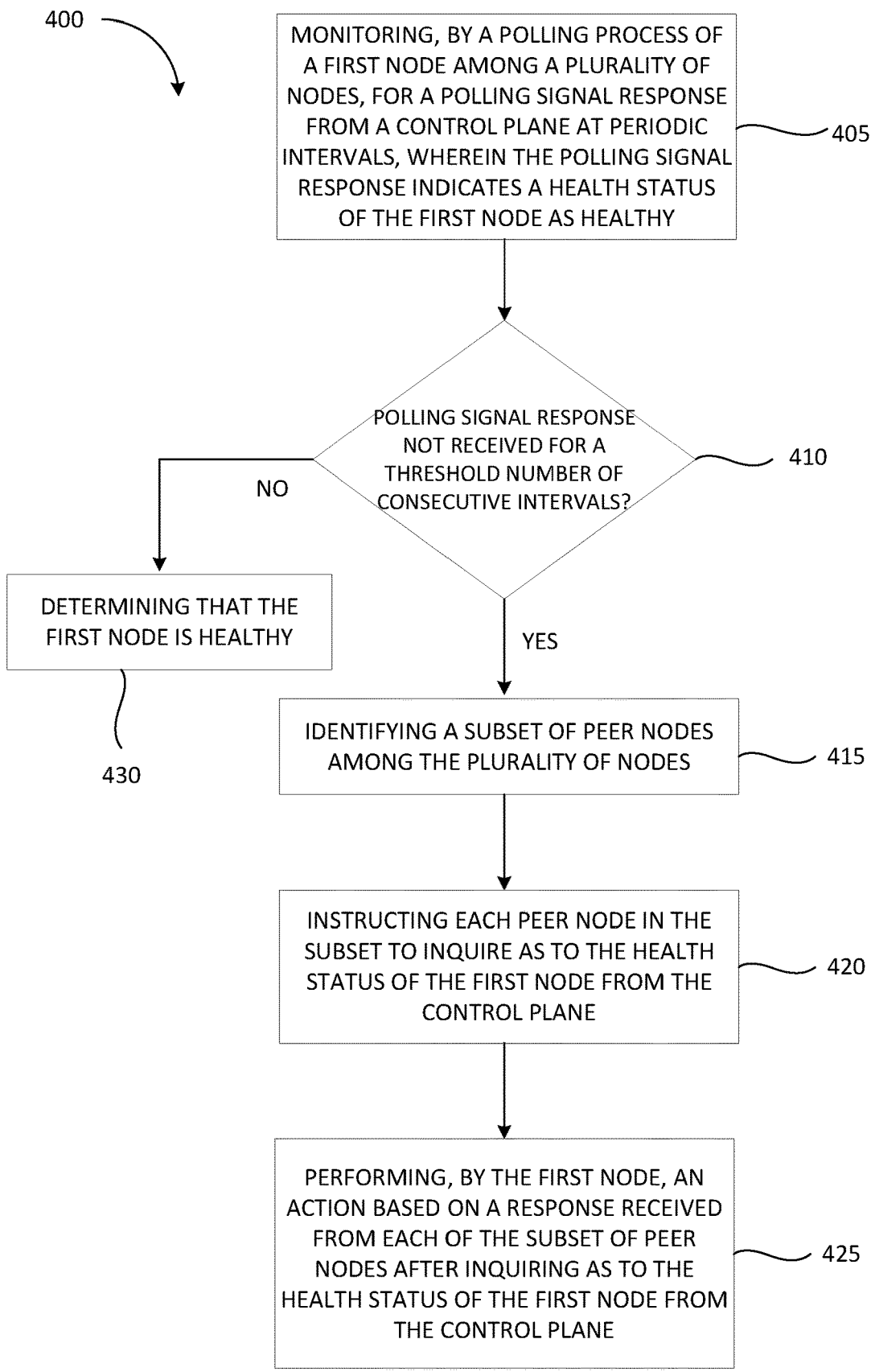
FIG. 4 is a flow diagram of a method for determining whether to shut down a worker node when communication between the worker node and a control plane is disabled, in accordance with some embodiments of the present disclosure.

FIG. 4 is a flow diagram of a method 400 for determining whether to shut down a worker node when communication between the worker node and a control plane is disabled, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 110 illustrated in FIGS. 1, 2, and 3).

Referring also to FIGS. 2 and 3, The control plane 215 may include a machine health check component (not shown) that determines whether each node 131 is healthy or unhealthy based on criteria defined by e.g., a user and update a corresponding record 221 of the node with the health status (e.g., healthy or unhealthy) whenever a polling signal is received from the node's polling process 133. Each polling signal may include the current health information of the node. The criteria may be based on any combination of the above factors, including communication status, memory capacity, and processing capacity. For example, the criteria may specify that a node 131 must have insufficient memory and insufficient processing capacity for 30 seconds, before that node 131 can be declared unhealthy.

Each node 131 may communicate with the control plane 215 by using its polling process 133 to send a polling signal at regular intervals to report its health information and inquire as to its health status (or the health status of another node 131) from the etcd store 220. If a node 131 (in the example described herein, node 131A) determines that it is unhealthy based on its health status (e.g., based on the reply received from the control plane 215), then its polling process 133A may stop transmitting a heartbeat signal to its respective watchdog device 132A, which will eventually trigger a shut down and enter a safe state (e.g., by power cycling) as discussed in further detail herein. Each of the nodes 131 may include a respective watchdog device 132 that will initiate a shut down of the node 131 based on certain conditions as discussed in further detail herein. The watch dog device 132 for each node 131 may be implemented in hardware, software, or may be virtualized.

However, there are situations that can result in a false unhealthy assessment of a node 131 and thus an unnecessary shut down. An example of such a situation includes where the corresponding polling process 133A of a node 131A cannot communicate with the control plane 215 because of resource unavailability (e.g., CPU unavailability) of the control plane. If a node 131A cannot reach the control plane 215 in this scenario, then it may initiate a shut down even though it may be healthy as its polling process 133A cannot transmit polling signals to the control plane 215 to inquire as to node 131A's health status and therefore cannot transmit heartbeat signals to the watchdog device 132A.

Thus, at block 405, node 131A (via the watch dog device 132A) may monitor for a heartbeat signal from a polling process 133A at periodic intervals, and if at block 410, the watch dog device 132A does receive a threshold number of successive heartbeat signals, then node 131A may determine at block 430 that it is healthy and that no shut down is needed. If at block 410, the watch dog device 132A does not receive a threshold number of successive heartbeat signals, the node 131A will be reset.

Figure 5:
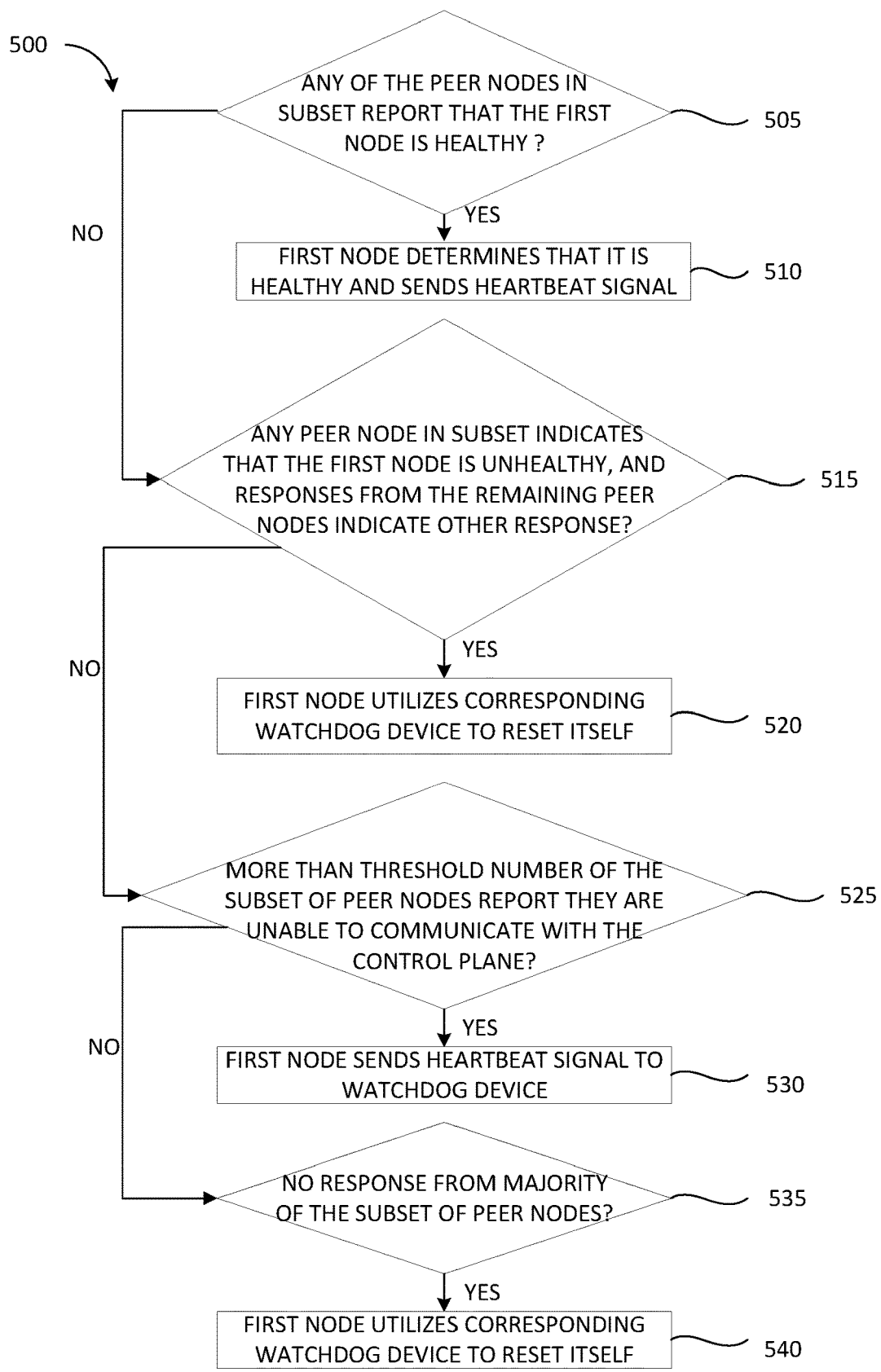
FIG. 5 is a flow diagram of a method for determining whether to shut down a worker node based on communication with peer nodes, in accordance with some embodiments of the present disclosure.

FIG. 5 is a flow diagram of a method 500 for determining whether to shut down a worker node based on communication with peer nodes, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 110 illustrated in FIGS. 1, 2, and 3).

Referring also to FIGS. 2 and 3, there are also situations that can result in a false unhealthy assessment of a node 131A due to network splits. For example, the control plane 215 may be hung, in which case there is a substantial likelihood that the polling process 133A will miss more than the threshold number of successive heartbeat signals, and the watchdog 132A may initiate shut down of the node 131A even though it is still healthy. To prevent shutting down the node 131A based on a false unhealthy assessment due to a network split, in response to not receiving a reply from the control plane 215 for a threshold number of successive polling signals (thereby causing the polling process 133A to not send a threshold number of consecutive heartbeat signals to the watchdog device 132A), the node 131A may select a random subset of peer nodes 131 and ask each of them to communicate with the control plane 215 and inquire with the control plane 215 as to its health status.

Each of the peer nodes 131 in the subset may attempt to communicate with the control plane 215 to ascertain the health status of the node 131A and then respond to the node 131A. The response from a peer node 131 may indicate that the node 131A is healthy, the node 131A is unhealthy, or that the peer node 131 is unable to communicate with the control plane 215. Alternatively, no response may be received from the peer node 131 (e.g., because of timeout or any TCP/HTTP error).

At block 505, if any of the peer nodes 131 in the subset report that the node 131A is healthy, then at block 510 node 131A may determine that it is healthy and the polling process 133A may send a heartbeat signal to the watchdog device 132A. This is because not all peer nodes 131 will have the same view of the etc store 220 and will not be exactly synchronized. At block 515, if at least one peer node 131 reports that the node 131A is unhealthy, and the remaining peer nodes 131 report that they are unable to communicate with the control plane 215, or no response is received from one or more remaining peer nodes 131 (e.g., because of timeout or any TCP/HTTP error), then at block 520 the node 131A may utilize the watchdog device 132A to reset itself. At block 525, if more than a threshold number of the subset of peer nodes 131 report that they are unable to communicate with the control plane 215, this may indicate that there is an issue with control plane 215 and that the nodes 131 may be healthy. Thus, at block 530, node 131A (via polling process 133A) may continue to send heartbeat signals to watchdog device 132A. At block 535, if there is no response from a majority of the subset of peer nodes 131, this may indicate that there is an issue with node 131A itself and at block 540 the node 131A may utilize its watchdog device 132A to trigger a reset of itself. In any other case, the node 131A may randomly select another subset of peer nodes 131 and ask them to inquire as to its health status from the control plane 215 and report back to it. The above described process may be performed by any node 131 that is unable to retrieve its own health status from the control plane 215.

Figure 6:
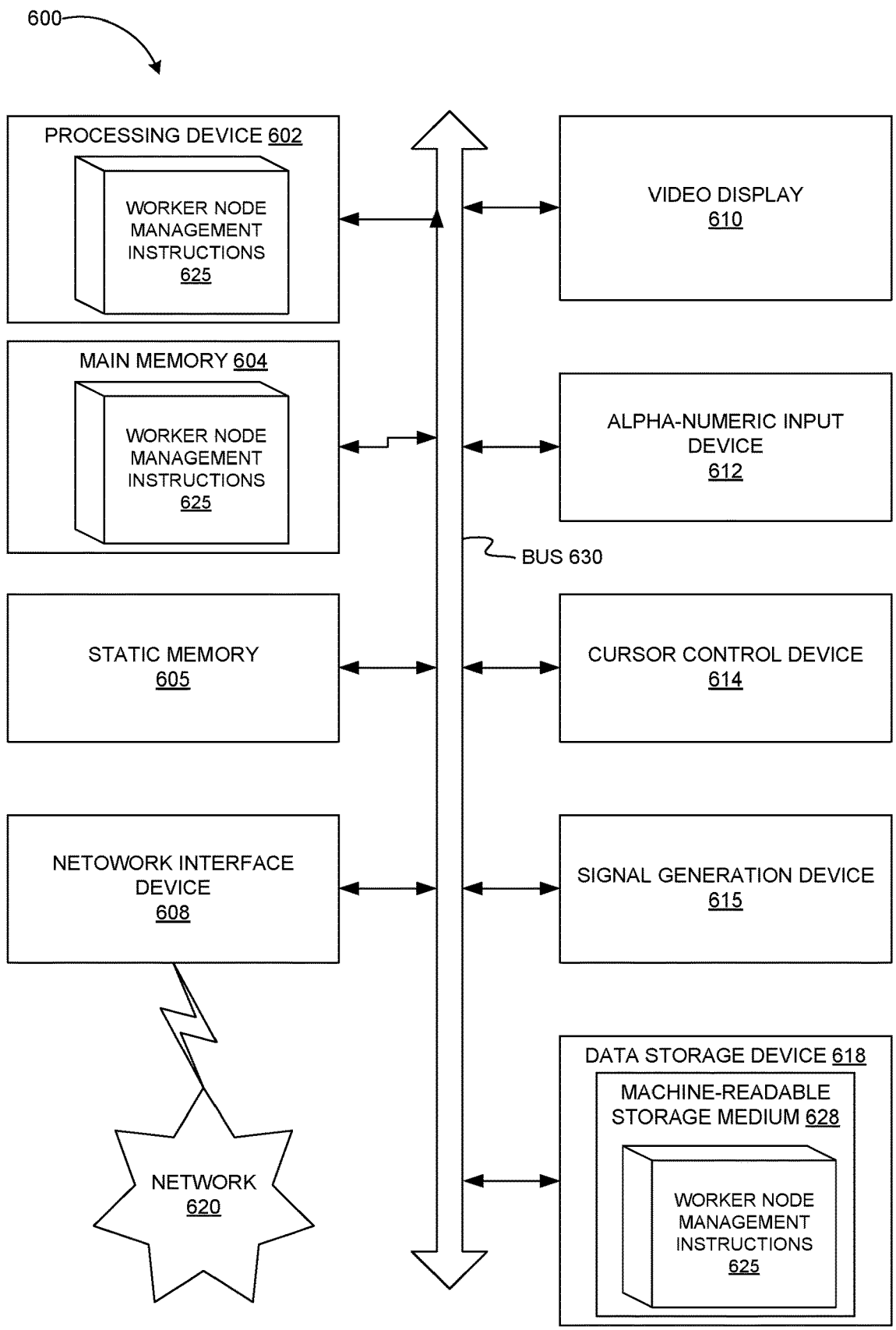
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for managing nodes that have lost contact with the control plane. More specifically, the machine may utilize a watchdog device of a first node among a plurality of nodes to monitor for a heartbeat signal at regular intervals and only initiate a shut down when the heartbeat signal has not arrived for a threshold number of intervals. In this way, if polling process 133A becomes deadlocked or starved of CPU cycles, the node will be considered unhealthy and shut down. If the polling signal has not been received for a threshold number of consecutive intervals, this may be indicative of other situations that can result in a false unhealthy assessment of a node due to network splits, for example. Network splits or scenarios where the control plane may be hung, mean that it cannot communicate with the polling process and there is a substantial likelihood that the polling process will miss more than the threshold number of successive heartbeat signals, and the respective watchdog may initiate shut down of the first node even though it is still healthy. Thus, in response to not receiving the polling signal for a threshold number of consecutive intervals, the processing device may identify a subset of peer nodes among the plurality of nodes and instruct each peer node in the subset to inquire as to the health status of the first node from the control plane. The first node may perform an action based on the number and types of responses received from the subset of peer nodes after they have inquired as to the health status of the first node from the control plane.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute worker node management instructions 625, for performing the operations and steps discussed herein.

The data storage device 618 may include a machine-readable storage medium 628, on which is stored one or more sets of worker node management instructions 625 (e.g., software) embodying any one or more of the methodologies of functions described herein. The worker node management instructions 625 may also reside, completely or at least partially, within the main memory 604 or within the processing device 602 during execution thereof by the computer system 600; the main memory 604 and the processing device 602 also constituting machine-readable storage media. The worker node management instructions 625 may further be transmitted or received over a network 620 via the network interface device 608.

The machine-readable storage medium 628 may also be used to store instructions to perform a method for determining whether to shut down a worker node when communication between the worker node and a control plane is disabled, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
monitoring, by a polling process of a first node among a plurality of nodes, for a polling signal response from a control plane at periodic intervals, wherein the polling signal response indicates a health status of the first node as healthy and wherein the control plane is hosted on a first computing device and each of the plurality of nodes is hosted on a respective second computing device;
in response to not receiving the polling signal response for a threshold number of consecutive intervals:
identifying, by the first node, a subset of peer nodes among the plurality of nodes;
instructing each peer node in the subset to inquire as to the health status of the first node from the control plane and forward a response received from the control plane to the first node; and performing, by the first node, an action to reset itself or continue operating based on a response received by each of the subset of peer nodes after inquiring as to the health status of the first node from the control plane.

2. The method of claim 1, wherein a heartbeat signal is received from the polling process at periodic intervals by a watchdog device of the first node, the watchdog device to reset the first node based on a failure to receive a threshold number of consecutive heartbeat signals.

3. The method of claim 2, wherein the control plane includes a cluster state store that includes, for each of the plurality of nodes, a record indicating a health status of the node, the health status of each node based, at least in part, on one or more of: whether the control plane is in communication with the node, a memory capacity of the node, and a processing capacity of the node.

4. The method of claim 3, wherein a response received from a peer node after inquiring as to the health status of the first node indicates that the first node is healthy, the first node is unhealthy, the peer node is unable to communicate with the cluster state store on the control plane, or no response was received from the peer node.

5. The method of claim 4, wherein performing, by the first node, an action to reset itself or continue operating comprises:
transmitting a heartbeat signal to the watchdog device if the response of any of the peer nodes in the subset indicate that the first node is healthy; and
using the watchdog device to reset itself if the response of at least one peer node in the subset indicates that the first node is unhealthy, and the responses from the remaining peer nodes in the subset indicate that the peer node is unable to communicate with the control plane, or no response was received from the peer node.

6. The method of claim 4, wherein performing, by the first node, an action to reset itself or continue operating comprises:
transmitting a heartbeat signal to the watchdog device if more than a threshold number of the peer nodes in the subset report that they are unable to communicate with the control plane; and
using the watchdog device to reset the first node if there is no response from a majority of the peer nodes in the subset.

7. The method of claim 3, wherein for each node, the control plane periodically updates a record indicating a health status of the node based at least in part on a polling signal received from the polling process of the first node, wherein the polling signal indicates whether the control plane is in communication with the node, a memory capacity of the node, and a processing capacity of the node.

8. A system comprising:
a first computing device hosting a control plane; and
a plurality of second computing devices, each of the plurality of second computing devices hosting a respective node of a plurality of nodes, wherein a first node of the plurality of nodes is to:
monitor, by a polling process of the first node, for a polling signal response from the control plane at periodic intervals, wherein the polling signal response indicates a health status of the first node as healthy;

in response to not receiving the polling signal response for a threshold number of consecutive intervals:
identify a subset of peer nodes among the plurality of nodes;
instruct each peer node in the subset to inquire as to the health status of the first node from the control plane and forward a response received from the control plane to the first node; and
perform an action to reset itself or continue operating based on a response received by each of the subset of peer nodes after inquiring as to the health status of the first node from the control plane.

9. The system of claim 8, wherein the first node comprises a watchdog device that receives a heartbeat signal from the polling process at periodic intervals, the watchdog device to reset the first node based on a failure to receive a threshold number of consecutive heartbeat signals.

10. The system of claim 9, wherein the control plane includes a cluster state store that includes, for each of the plurality of nodes, a record indicating a health status of the node, the health status of each node based, at least in part, on one or more of: whether the control plane is in communication with the node, a memory capacity of the node, and a processing capacity of the node.

11. The system of claim 10, wherein a response received from a peer node after inquiring as to the health status of the first node indicates that the first node is healthy, the first node is unhealthy, the peer node is unable to communicate with the cluster state store on the control plane, or no response was received from the peer node.

12. The system of claim 11, wherein to perform an action to reset itself or continue operating, the first node is to:
transmit a heartbeat signal to the watchdog device if the response of any of the peer nodes in the subset indicate that the first node is healthy; and
use the watchdog device to reset itself if the response of at least one peer node in the subset indicates that the first node is unhealthy, and the responses from the remaining peer nodes in the subset indicate that the peer node is unable to communicate with the control plane, or no response was received from the peer node.

13. The system of claim 11, wherein to perform an action to reset itself or continue operating, the first node is to:
transmit a heartbeat signal to the watchdog device if more than a threshold number of the peer nodes in the subset report that they are unable to communicate with the control plane; and
use the watchdog device to reset the first node if there is no response from a majority of the peer nodes in the subset.

14. The system of claim 10, wherein for each node, the control plane periodically updates a record indicating a health status of the node based at least in part on a polling signal received from the polling process of the first node, wherein the polling signal indicates whether the control plane is in communication with the node, a memory capacity of the node, and a processing capacity of the node.

15. A non-transitory computer-readable medium having instructions stored thereon which, when executed by a processing device of a computing device on which a first node of a plurality of nodes is hosted, cause the processing device to:
monitor, by a polling process of the first node, for a polling signal response from a control plane at periodic intervals, wherein the polling signal response indicates a health status of the first node as healthy and wherein the control plane is hosted on a first computing device and each of the plurality of nodes is hosted on a respective second computing device;

in response to not receiving the polling signal response for a threshold number of consecutive intervals:
  identify a subset of peer nodes among the plurality of nodes;
  instruct each peer node in the subset to inquire as to the health status of the first node from the control plane and forward a response received from the control plane to the first node; and
  perform, by the first node, an action to reset itself or continue operating based on a response received by each of the subset of peer nodes after inquiring as to the health status of the first node from the control plane.

16. The non-transitory computer-readable medium of claim 15, wherein the processing device receives a heartbeat signal from the polling process at periodic intervals using a watchdog device of the first node, the watchdog device to reset the first node based on a failure to receive a threshold number of consecutive heartbeat signals.

17. The non-transitory computer-readable medium of claim 16, wherein the control plane includes a cluster state store that includes, for each of the plurality of nodes, a record indicating a health status of the node, the health status of each node based, at least in part, on one or more of: whether the control plane is in communication with the node, a memory capacity of the node, and a processing capacity of the node.

18. The non-transitory computer-readable medium of claim 17, wherein a response received from a peer node after inquiring as to the health status of the first node indicates that the first node is healthy, the first node is unhealthy, the peer node is unable to communicate with the cluster state store on the control plane, or no response was received from the peer node.

19. The non-transitory computer-readable medium of claim 18, wherein to perform, by the first node, an action to reset itself or continue operating, the processing device is to:
  transmit a heartbeat signal to the watchdog device if the response of any of the peer nodes in the subset indicate that the first node is healthy; and
  use the watchdog device to reset itself if the response of at least one peer node in the subset indicates that the first node is unhealthy, and the responses from the remaining peer nodes in the subset indicate that the peer node is unable to communicate with the control plane, or no response was received from the peer node.

20. The non-transitory computer-readable medium of claim 18, wherein to perform, by the first node, an action to reset itself or continue operating, the processing device is to:
  transmit a heartbeat signal to the watchdog device if more than a threshold number of the peer nodes in the subset report that they are unable to communicate with the control plane; and
  use the watchdog device to reset the first node if there is no response from a majority of the peer nodes in the subset.

* * * * *